United States Patent
Lu et al.

(10) Patent No.: US 10,277,448 B1
(45) Date of Patent: Apr. 30, 2019

(54) METHOD FOR HIERARCHICAL MODULATION WITH VECTOR PROCESSING

(71) Applicant: NXP USA, Inc., Austin, TX (US)

(72) Inventors: Sili Lu, Austin, TX (US); Leo G. Dehner, Euless, TX (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 15/802,069

(22) Filed: Nov. 2, 2017

(51) Int. Cl.
  *H04L 27/34* (2006.01)
  *H04L 27/36* (2006.01)
  *H04B 1/38* (2015.01)

(52) U.S. Cl.
  CPC ........ *H04L 27/3422* (2013.01); *H04L 27/362* (2013.01); *H04B 1/38* (2013.01); *H04L 27/345* (2013.01); *H04L 27/3488* (2013.01); *H04L 27/36* (2013.01)

(58) Field of Classification Search
  CPC . H04L 27/3488; H04L 27/36; H04L 27/3405; H04L 27/345; H04L 27/3422; H04L 27/362; H04B 1/38
  See application file for complete search history.

(56) References Cited

U.S. PATENT DOCUMENTS

| | | |
|---|---|---|
| 7,480,338 B2 | 1/2009 | Kang et al. |
| 8,654,880 B2 | 2/2014 | Zhou et al. |
| 8,798,200 B2 | 8/2014 | Xu et al. |
| 2009/0074091 A1 | 3/2009 | Ghosh et al. |
| 2010/0061468 A1 | 3/2010 | Aziz et al. |
| 2010/0158046 A1 | 6/2010 | Pu |
| 2010/0184391 A1 | 7/2010 | Razzell |
| 2011/0058471 A1 | 3/2011 | Zheng |
| 2011/0307673 A1 | 12/2011 | Engin |
| 2016/0050047 A1 | 2/2016 | Engin |
| 2017/0288935 A1* | 10/2017 | Montorsi ............... H04L 27/36 |
| 2017/0310528 A1* | 10/2017 | Hui ................ H04L 27/3488 |

FOREIGN PATENT DOCUMENTS

KR  1020040032587  * 4/2004 ........... H04L 27/36

* cited by examiner

*Primary Examiner* — Sophia Vlahos (57) ABSTRACT

A constellation mapping method, system, and apparatus are provided for mapping a received bit stream of data to a higher order symbol vector by processing a first set of selected bits from the received bit stream with a quadrant selector to identify a first quadrant offset vector corresponding a higher order quadrant in which an intended symbol is to be mapped, processing a second set of selected bits from the received bit stream with a 16-QAM mapper to identify a 16-QAM symbol vector, transforming the 16-QAM symbol vector into a transformed 16 QAM symbol vector based on the identified higher order quadrant, and combining the transformed 16-QAM symbol vector with the first quadrant offset vector to map the bit stream of data to a higher order symbol vector.

20 Claims, 5 Drawing Sheets

METHOD FOR HIERARCHICAL MODULATION WITH VECTOR PROCESSING

BACKGROUND OF THE INVENTION

Field of the Invention

The present invention is directed in general to field of wireless communication systems. In one aspect, the present invention relates generally to a constellation mapping method and apparatus for use in a wireless transmitter.

Description of the Related Art

Wireless communication systems transmit and receive signals within a designated electromagnetic frequency spectrum, but the capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed based on OFDM ("Orthogonal Frequency Division Multiplexing") and MIMO ("Multiple Input Multiple Output") techniques—such as 3GPP/4G LTE ("Long Term Evolution"), LTE-Advanced and WiMax ("Worldwide Interoperability for Microwave Access") networks. According to OFDM techniques, bits to be transmitted are split into bit sequences which are then modulated by separate and reciprocally orthogonal sub-carriers and multiplexed into a data stream (i.e., a stream of data including (OFDM) symbols, or symbols stream) for transmission. According to MIMO techniques, multiple symbols streams are transmitted and received using multiple transmit antennas and multiple receive antennas which send and receive more than one data signal simultaneously over the same radio channel by exploiting multipath propagation. As higher-order modulations (e.g. 64-QAM, 256-QAM, etc.) are increasingly used to increase system throughput, the look-up table approaches traditionally used at transmitters for mapping information bits to complex points in a constellation map impose larger memory requirements, with the memory costs increasing as the modulation order goes higher. There are also processing overhead costs imposed by using one or more higher order modulation schemes. As seen from the foregoing, the existing solutions for efficiently mapping information bits to higher order modulation symbol streams for use in a wireless communication system are extremely difficult at a practical level by virtue of the difficulty balancing the design constraints for providing a memory and cost efficient constellation mapping function with the performance demands for performing high data rate wireless transmission. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A constellation mapping system, apparatus, and methodology are described for a wireless transceiver communication system which uses one or more quadrant selectors and a 16 QAM mapper to perform hierarchical modulation with a vector processor and a fixed 16 QAM constellation table. In selected embodiments, a constellation mapping engine is disclosed which may be implemented with a vector processor which performs vector combination operations on vectorized outputs from quadrant selector and 16 QAM mapper to calculate higher order mapping symbols (e.g., 64 QAM symbols) for input to a modulator. In addition, the ability to build a higher order modulation transceiver using a basic quadrant selector and a 16-QAM mapper which only needs a fixed 16-element mapping table eliminates the need to maintain a number of mapping tables, thereby significantly reducing the table memory storage requirements. In selected embodiments of the present disclosure, predetermined bits (e.g., bits $b_0$ and $b_3$) from an incoming bit stream are processed by a quadrant selector to select a corresponding quadrant and to generate therefrom a quadrant offset vector, such as by applying quadrant selector outputs to quadrant masks for combination with predetermined quadrant offset vectors based on the masking results. In addition, the remaining bits of the incoming bit stream are applied to a 16 QAM mapper and to generate therefrom a 16 QAM symbol vector which is transformed by the vector processor based on the masking results, and then combined with the quadrant offset vector. Using the vector processor to combine the vectorized outputs from quadrant selector and 16 QAM mapper, higher order mapping symbols (e.g., 64 QAM symbols) are generated for use in additional processing, either at a modulator or at the vector processor which performs vector combination operations using an appropriately scaled vector offset value (e.g., 2× or 4×). In disclosing the claimed apparatus, system, and method for performing constellation mapping by using individually configurable rules with a 16 QAM map and quadrant selector, rather than humans, to compute and combine a transformed 16 QAM vector and quadrant offset vector into a higher order QAM symbol vector using predetermined bits from an incoming bitstream, there is disclosed an improvement in computer-related technology for improving the performance, speed, and accuracy of a wireless transceiver communication system.

Figure 1:
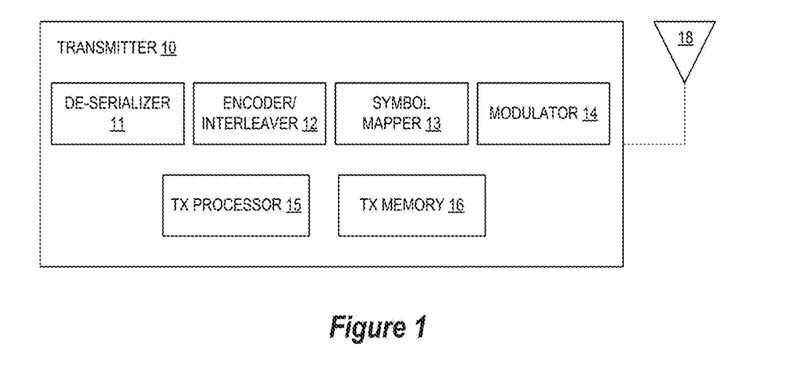
FIG. 1 depicts a schematic block diagram of a wireless communication transmitter system.

To provide a contextual understanding for selected embodiments of the present disclosure, reference is now made to FIG. 1 which depicts a schematic block diagram of a wireless communication transmitter 10 which may be used in a network communication system to communicate with a receiver (not shown). In selected embodiments, the transmitter 10 is embodied as a transceiver. Although certain component parts are shown in conjunction with the transmitter 10 of FIG. 1, other embodiments may include fewer or more component parts, or equivalent parts, to perform fewer or more pulse shaping functions. Additionally, while the components of the transmitter 10 are shown as being separate components, some of these components may be integrated or combined. For example, one or more of the components of the transmitter 10 may be implemented in a single integrated circuit (IC) such as a transceiver IC. Furthermore, some of the components of the transmitter 10 such as the modulator 14, may be implemented in a combination of software, hardware, and/or firmware.

As depicted in FIG. 1, the transmitter 10 may include a transmit (TX) processor 15, and transmit (TX) memory device 16, a de-serializer 11, an encoder/interleaver 12, a symbol mapper 13, a modulator 14, and at least one transmit antenna 18. In general, the transmitter 10 transmits data to a receiver using a wireless communication standard, such as 802.11, LTE, 5G, etc. In some embodiments, the transmitter 10 transmits OFDM packets to the receiver. Regardless of which wireless communication standard is used, the transmit memory device 16 stores data associated with the data transmitted from the transmitter 10 to the receiver, and the transmit processor 15 provides operative control functionality for the operations associated with the packetizing and modulation of data and the transmission of the modulated packets of data.

In selected example embodiments, the de-serializer 11 receives a segment of data from the transmit memory device 16, such as by receiving a serial data segment and performing a serial to parallel conversion that converts the serial data stream to parallel. In some embodiments, the de-serializer 11 sends the parallel data segments to the encoder/interleaver which performs convolutional encoding and interleaving on the incoming data. The output from the encoder/interleaver 12 is provided to the symbol mapper 13 which maps the incoming bits to constellation map symbol. In an OFDM transmission, each symbol typically transmits 40-4000) bits, although any number of bits may be used. A serial to parallel conversion stage is used to convert the input serial bit stream to the specific amount of data to be transmitted in each OFDM symbol. The data allocated to each symbol depends on the modulation scheme and the number of sub-carriers used. Exemplary OFDM modulation schemes include Binary Phase Shift Keying (BPSK), Quadrature Phase Shift Keying (QPSK), and Quadrature Amplitude Modulation (QAM). For an example sub-carrier modulation of 16-QAM, each sub-carrier carries 4 bits of data, and so for a transmission using 100 sub-carriers, the number of bits per symbol would be 400.

In selected embodiments, the symbol mapper 13 maps a symbol map pattern to each parallel data segment. For example, the symbol mapper 13 configures a Gray-coded symbol map pattern and applies the Gray-coded symbol map pattern to the parallel data segment. In an OFDM system, bits are mapped to complex (IQ) symbols which are then used to modulate a sub-carrier in the OFDM symbol. In such embodiments, the symbol mapper 13 determines the phase and amplitude of each sub-carrier and maps the phase and amplitude to a complex IQ symbol that represents the phase and amplitude. The amplitude and phase of each sub-carrier is determined based on the modulation scheme. Bits are converted into IQ symbols by mapping sets of bits onto points on the IQ plane based on an M-ary symbol map.

The symbol stream output from the symbol mapper 13 is provided to the modulator unit 314 which transforms the mapped complex symbols to modulate a sub-carrier in the OFDM symbol. In selected embodiments, the modulator 14 performs an Inverse Fast Fourier Transform (IFFT) on each data point in the frequency spectrum, where the resulting IFFT bin corresponds to the amplitude and phase of a set of orthogonal sinusoids, thereby ensuring that the generated sub-carriers are orthogonal. The orthogonal sub-carriers for the OFDM signal are generated by setting the amplitude and phase of each frequency bin and then performing the IFFT. The spectrum is constructed using the calculated amplitudes and phases of the sub-carriers. By transforming a spectrum (amplitude and phase of each component) into a time domain signal, the modulator 14 converts a number of complex data points, which represent a signal in the frequency domain, into the equivalent time domain signal with the same number of points. In selected embodiments, the modulator 14 modulates the bit-to-symbol mapped transmission packet at the physical layer (PHY) and drives the transmitter antenna 18 with the modulated transmission packet. In some embodiments, the modulator 14 includes a radio frequency modulator and/or an IQ modulator. In some embodiments, the modulator 14 upconverts a channelized Intermediate Frequency (IF) signal and upconverts the IF signal to provide a wideband multicarrier Radio Frequency (RF) output signal. The transmit antenna 18 then transmits the modulated transmission packet signal to the receiver, such as by transmitting the wideband multicarrier RF output signal to the receiver.

Figure 2:
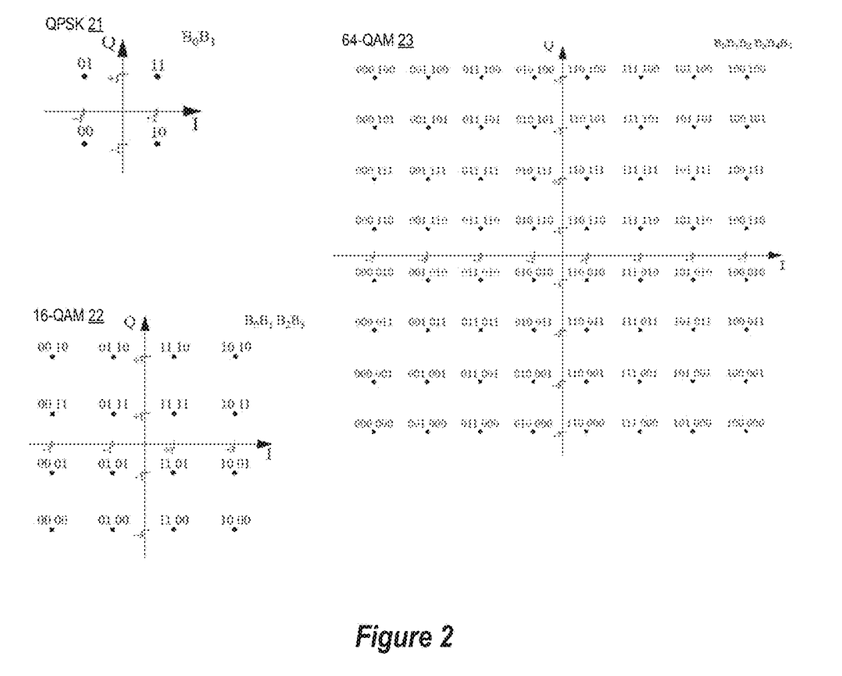
FIG. 2 diagrammatically depicts symbol constellation maps for a QPSK modulation scheme, a 16 QAM modulation scheme, and a 64 QAM modulation scheme.

To provide a contextual understanding for selected embodiments of the present disclosure, reference is now made to FIG. 2 which diagrammatically depicts symbol constellation maps for a QPSK modulation scheme 21, a 16 QAM modulation scheme 22, and a 64 QAM modulation scheme 23. In particular, the QPSK modulation scheme 21 diagrammatically represents a symbol constellation map for a signal modulated using Quadrature Phase Shift Keying (QPSK) modulation where a grid of four symbol points are oriented along both a horizontal in-phase axis (I) and a vertical quadrature-phase axis (Q) and where the horizontal rows and vertical columns correspond to different values associated with a set of bits, $B_0$ and $B_1$. As indicated, the QPSK constellation 21 is used to map a set of 2 bits, $B_0$ and $B_1$, to the four points in the symbol constellation map 21, where the specific bit values are defined under the applicable wireless communication standard (e.g., 802.11(a)). In similar fashion, the 16 QAM modulation scheme 22 diagrammatically represents a symbol constellation map for a signal modulated using Quadrature Amplitude Modulation (QAM), where the grid of 16 symbol points oriented along the horizontal in-phase axis (I) and vertical quadrature-phase axis (Q) such that the horizontal rows and vertical columns correspond to different values associated with a set of bits, $B_0$, $B_1$, $B_2$, $B_3$. Thus, the 16 QAM constellation 22 is used to map a set of 4 bits, $B_0$, $B_1$, $B_2$, $B_3$, to the 16 points in symbol constellation map 22 using the applicable wireless communication standard requirements for such values. Finally, the 64 QAM modulation scheme 23 diagrammatically represents a symbol constellation map for a signal modulated using 64-QAM modulation, where the grid of 64 symbol points are oriented along the horizontal in-phase axis (I) and vertical quadrature-phase axis (Q) such that the horizontal rows and vertical columns correspond to different values associated with a set of bits, $B_0$, $B_1$, $B_2$, $B_3$, $B_4$, $B_5$. Thus, the 64 QAM constellation 23 is formed by mapping a set of 6 bits, $B_0$, $B_1$, $B_2$, $B_3$, $B_4$, $B_5$, to the 64 points in symbol constellation map 23.

Figure 3:
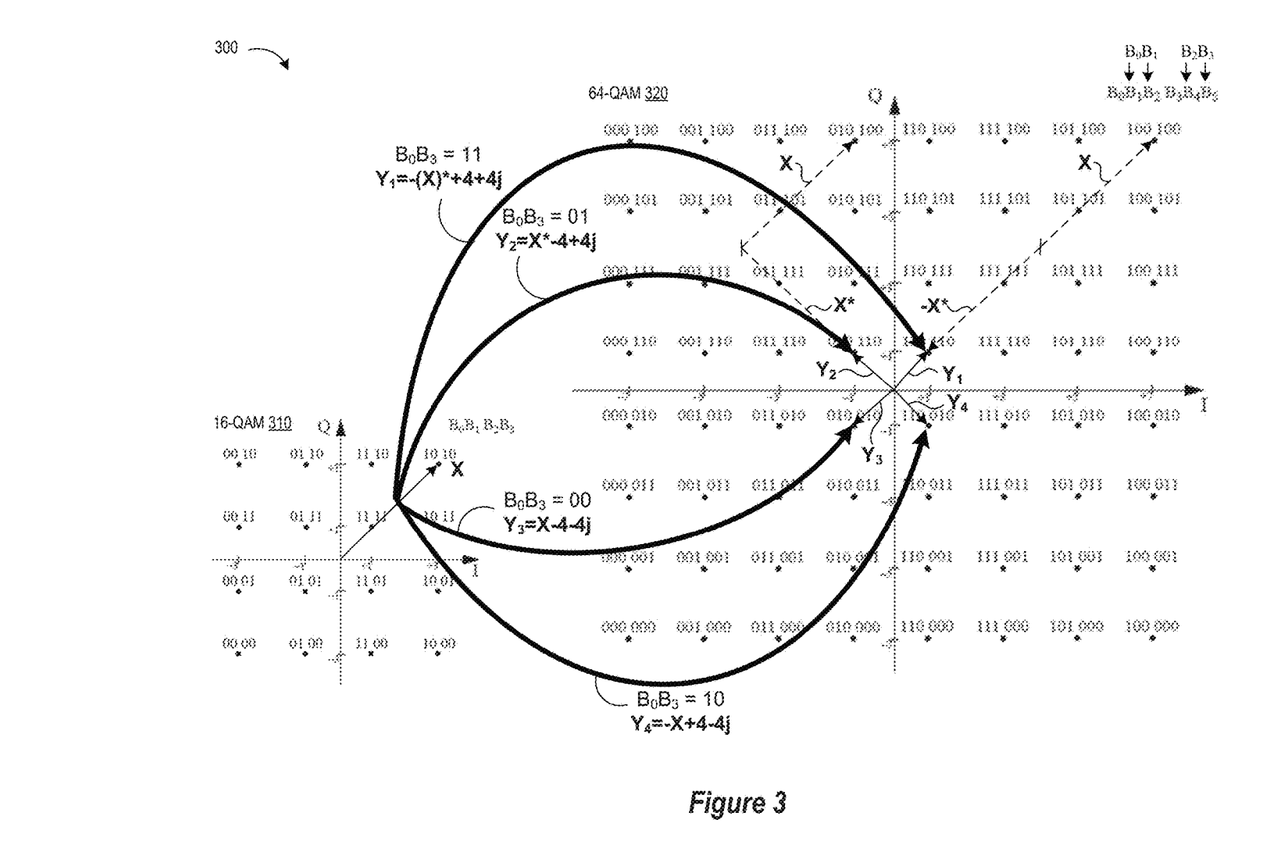
FIG. 3 diagrammatically depicts a process for building a higher order symbol constellation map from a 16 QAM map and a basic quadrant selector in accordance with selected embodiments of the present disclosure.

With reference to the foregoing example of symbol constellation maps, there is provided herein a hierarchical constellation mapping system, apparatus, and methodology which may be used to build a higher order modulation map by a basic quadrant selector and a 16-QAM mapper which needs only a fixed 16-element mapping table, thus eliminating the need to maintain a number of mapping tables and thereby providing significant reductions in memory requirements as compared to conventional table-based higher order modulation schemes. To provide an illustrative example of the hierarchical constellation mapping approach, reference is now made to FIG. 3 which diagrammatically depicts a process 300 for building a higher order 64-QAM symbol constellation map 320 from a 16-QAM map 310 by using a basic quadrant selector to construct each quadrant of the 64-QAM symbol constellation map 320. However, it will be appreciated that any higher order modulation can be flexibly built by a cascade of QPSK or quadrant selector and 16-QAM mapper. In the depicted example of FIG. 3, a 16-QAM vector X representing the information bits $B_0$, $B_1$, $B_2$, $B_3$ the 16-QAM constellation map 310 can be transformed into a 64-QAM vector Y in each quadrant of the 64-QAM constellation map 320 by adding two additional information bits $B_0$, $B_3$ to the 16-QAM constellation map information bits $B_0$, $B_0$, $B_2$, $B_3$ which are converted, respectively to $B_1$, $B_2$, $B_4$, and $B_5$. As a result, the 64-QAM constellation map 320 can be represented by "new" information bit $B_0$, "old" information bit $B_1$ (formerly, 16-QAM information bit $B_0$), "old" information bit $B_2$ (formerly, 16-QAM information bit $B_1$), "new" information bit $B_3$, "old" information bit $B_4$ (formerly, 16-QAM information bit $B_3$), and "old" information bit $B_5$ (formerly, 16-QAM information bit $B_4$).

To illustrate how symbols in each quadrant of the 64-QAM map 320 can be constructed from 16-QAM vectors in the 16-QAM constellation map 310, it can be seen that the 64-QAM constellation point (110 110) in the first quadrant of the 64-QAM map 320 can be constructed as a 64-QAM vector $Y_1$ by combining an offset vector for the first quadrant (4+4j) with a first transformation of the 16-QAM vector (e.g., $-X^*$ which represents the inversion of the 16-QAM vector X about both the I and Q axes). In other words, $Y_1=-X^*+4+4j$. In similar fashion, the 64-QAM constellation point (010 110) in the second quadrant of the 64-QAM map 320 can be constructed as a 64-QAM vector $Y_2$ by combining an offset vector for the first quadrant (−4+4j) with a second transformation of the 16-QAM vector (e.g., $X^*$ which represents the inversion of the 16-QAM vector X about the I axis). Stated as an equation, $Y_2=X^*-4+4j$. Likewise, the 64-QAM constellation point (010 010) in the third quadrant of the 64-QAM map 320 can be constructed as a 64-QAM vector $Y_3$ by combining an offset vector for the first quadrant (4−4j) with a third transformation of the 16-QAM vector (e.g., X which represents the 16-QAM vector X that is transformed with an identify function). In other words, $Y_3=X-4-4j$. Finally, the 64-QAM constellation point (110 010) in the fourth quadrant of the 64-QAM map 320 can be constructed as a 64-QAM vector $Y_4$ by combining an offset vector for the first quadrant (4−4j) with a fourth transformation of the 16-QAM vector (e.g., $-X$ which represents the inversion of the 16-QAM vector X about the Q axis). In other words, $Y_4=-X+4-4j$. As seen from this example, the information bits $B_0$, $B_3$ in the 64-QAM constellation map information bits $B_0$, $B_1$, $B_2$, $B_3$, $B_4$, B, effectively specify which quadrant and transformation of the 16-QAM vector X is to be used to construct the 64-QAM constellation. However, it will be appreciated that other information bit-to-symbol constellation mappings may be used with different wireless communication standards, in which case different information bits may be used to specify a quadrant in the higher-order constellation map. For example, the 64-QAM map shown in FIG. 3 of U.S. Pat. No. 8,654,880 can use information bits $i_2$, $q_2$ to specify the quadrant in the map where each symbol is specified with constellation map information bits $i_0$, $i_1$, $i_2$, $q_0$, $q_1$, $q_2$.

Figure 4:
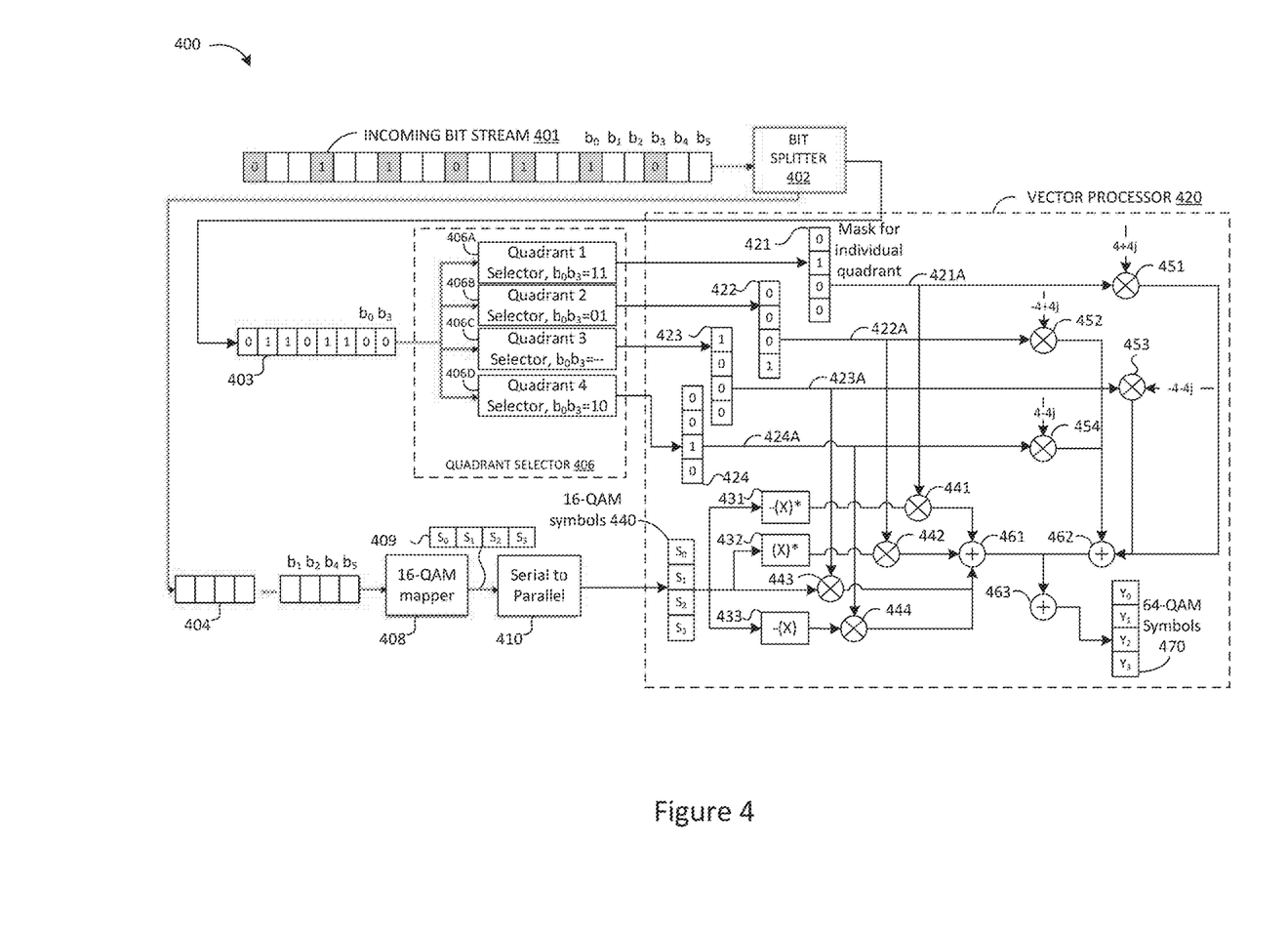
FIG. 4 is a schematic block circuit diagram of a wireless communication transmitter system having a vector processor for building a 64 QAM symbol constellation map from a 16 QAM mapper and a quadrant selector in accordance with selected embodiments of the present disclosure.

To provide additional details for an improved understanding of selected embodiments of the present disclosure, reference is now made to FIG. 4 which shows a schematic block circuit diagram of a wireless communication transmitter system 400 having a bit splitter circuit or module 402, quadrant selector 406, and 16 QAM mapper 408 for feeding quadrant selection and 16-QAM vector information to a vector processor 420 to build 64-QAM symbol constellation map values in accordance with selected embodiments of the present disclosure. As depicted, the incoming bit stream 401 includes sequential groups of information bits of $b_0$, $b_1$, $b_2$, $b_3$, $b_4$, $b_5$, each group corresponding to a 64-QAM symbol. However, instead of applying each information bit group to a 64-QAM lookup table (which would require significant memory storage), the incoming bit stream 401 is parsed or split at the bit splitter 402 into first and second bit streams, where the first bit stream 404 includes selected mapping bits (e.g., $b_1$, $b_2$, $b_4$, $b_5$) from each information bit group in the incoming bit stream 401, while the second bit stream 403 includes selected quadrant selection bits (e.g., $b_0$, $b_3$) from each information bit group in the incoming bit stream 401.

The first bit stream 404 is applied to the 16-QAM mapper 408 which uses a fixed 16-element mapping table to perform constellation mapping on the first bit stream 404. As described hereinbelow, the ability to use a fixed 16-QAM map eliminates the need to maintain a number of mapping tables for higher order modulation schemes, thereby significantly reducing the memory storage requirements. By processing the first bit stream 404, the 16-QAM mapper sequentially generates 16-QAM symbols 409 (e.g., $S_0$, $S_1$, $S_2$, $S_3$) which are converted by the serial-to-parallel converter 410 into vector form 440 for input to the vector processor 420. As input to the vector processor 420, the 16-QAM symbols 440 represent a 16-QAM vector X that is derived from the selected mapping bits (e.g., $b_1$, $b_2$, $b_4$, $b_5$) by the 16-QAM mapper 408.

In parallel, the second bit stream 403 is applied to the quadrant selector 406 which uses predetermined selection logic to determine from the selected quadrant selection bits (e.g., $b_0$, $b_3$) from each information bit group which quadrant the intended 64-QAM symbol is located. As will be appreciated, any desired hardware and/or software based selection logic may be used at the quadrant selector 406. For example, a Quadrant 1 Selector 406A may use a bit-pair comparator functionality to detect when the quadrant selection bits match a first value (e.g., $b_0=1$, $b_3=1$), a Quadrant 2 Selector 406B may use a bit-pair comparator functionality to detect when the quadrant selection bits match a second value (e.g., $b_0=0$, $b_3=1$), a Quadrant 3 Selector 406C may use a bit-pair comparator functionality to detect when the quadrant selection bits match a third value (e.g., $b_0=0$, $b_3=0$), and a Quadrant 4 Selector 406D may use a bit-pair comparator functionality to detect when the quadrant selection bits match a fourth value (e.g., $b_e=1$, $b_3=0$). By processing the second bit stream 403, the quadrant selector 406 generates quadrant selection output values which are input to the vector processor 420.

At the vector processor 420, the quadrant selection output values from the quadrant selector 406 may be processed with quadrant masks 421-424 to select the 64-QAM quadrant in which the intended 64-QAM symbol is located using any desired masking logic. As will be appreciated, any desired hardware and/or software based masking logic may be used. In the depicted example, a first quadrant mask 421 having mask values "0100" may be applied to effectively pass a second bit pair (e.g., $b_0=1$, $b_3=1$) from the second bit stream based on the second value in the mask being set to "1", causing the first quadrant mask 421 to output a selection value "1" as a mask output 421A. In addition, a second quadrant mask 422 having mask values "0001" may be applied to effectively pass a fourth bit pair (e.g., $b_0=0$, $b_3=1$) from the second bit stream based on the fourth value in the mask being set to "1", causing the second quadrant mask 422 to output a selection value "1" as a mask output 422A. In similar fashion, a third quadrant mask 423 having mask values "1000" may be applied to effectively pass a first bit pair (e.g., $b_0=0$, $b_3=0$) from the second bit stream based on the first value in the mask being set to "1", causing the third quadrant mask 423 to output a selection value "1" as a mask output 423A, and a fourth quadrant mask 424 having mask values "0010" may be applied to effectively pass a third bit pair (e.g., $b_0=1$, $b_3=0$) from the second bit stream based on the third value in the mask being set to "1", causing the fourth quadrant mask 424 to output a selection value "1" as a mask output 424A. By using multiplier circuit elements 451-454 to respectively combine the mask output values 421A-424A with corresponding offset vectors corresponding to each selected quadrant, masked quadrant offset vectors are generated at the output of each multiplier circuit element. In the depicted example, the first multiplier 451 combines the first quadrant mask output 421A with the first quadrant offset vector 4+4j to form a masked first quadrant offset vector, the second multiplier 452 combines the second quadrant mask output 422A with the second quadrant offset vector −4+4j to form a masked second quadrant offset vector, the third multiplier 453 combines the third quadrant mask output 423A with the third quadrant offset vector −4−4j to form a masked third quadrant offset vector, and the fourth multiplier 454 combines the fourth quadrant mask output 424A with the fourth quadrant offset vector 4−4j to form a masked fourth quadrant offset vector.

The vector processor also transforms the 16-QAM symbol vector X input derived from the first bit stream of mapping bits 404 (e.g., $b_1$, $b_2$, $b_4$, $b_5$) based on the quadrant mask output selection values 421A-424A. In the depicted example, a first vector transformation unit 431 inverts the 16-QAM symbol vector X around the I and Q axes for combination with the first quadrant mask output value 421A at the multiplier circuit 441 to generate a masked first transformed 16-QAM symbol vector (e.g., −(X)*) at the output of the multiplier circuit 441. In addition, a second vector transformation unit 432 inverts the 16-QAM symbol vector X around the I axis for combination with the second quadrant mask output value 422A at the multiplier circuit 442 to generate a masked second transformed 16-QAM symbol vector (e.g., X*) at the output of the multiplier circuit 442. In addition, a third vector transformation unit (not shown) applies an identity function to the 16-QAM symbol vector X for combination with the third quadrant mask output value 423A at the multiplier circuit 443 to generate a masked third transformed 16-QAM symbol vector (e.g., X) at the output of the multiplier circuit 443. Finally, a fourth vector transformation unit 433 inverts the 16-QAM symbol vector X around the Q axis for combination with the fourth quadrant mask output value 424A at the multiplier circuit 444 to generate a masked fourth transformed 16-QAM symbol vector (e.g., −X) at the output of the multiplier circuit 444.

At the first addition circuit 461, the masked transformed 16-QAM symbol vectors are summed or added for form a first summed output. In addition, the second addition circuit 462 sums or adds the masked quadrant offset vectors output from the multiplier circuit elements 451-454 to form a second summed output. And at the third addition circuit 463, the first and second summed outputs are summed or added to form the 64-QAM symbols 470 (e.g., $Y_0$, $Y_1$, $Y_2$, $Y_3$) representing a 64-QAM vector Y that is derived from the incoming bit stream 401 using the quadrant selector 406 and 16-QAM mapper 408. In addition to reducing the memory requirements by using only a fixed element 16-QAM map, the generation of the 64-QAM vector Y has the additional benefit of improving the modulation efficiency by vectorizing the modulation process.

While described hereinabove with reference to example embodiments in which a 16-QAM mapper and QPSK quadrant selector are used to build a 64-QAM constellation, the operative concepts disclosed herein may be applied to flexibly build any desired higher order modulation by employing a cascade of QPSK select and 16-QAM mapper. To provide additional details for an improved understanding of selected embodiments of the present disclosure, reference is now made to FIG. 5 which depicts a schematic block circuit diagram of a wireless communication transmitter system 500 having a 16 QAM mapper 507 cascaded with a plurality of quadrant selectors 504-506 and vector processors 510-512 for building one or more higher order symbol constellation maps (e.g., 256-QAM, 1024-QAM, etc.) from a 16 QAM mapper and a quadrant selector in accordance with selected embodiments of the present disclosure. In operation, the incoming bit stream 501 may be supplied or retrieved from memory and provided to the bit splitter 502 which parses or splits the incoming bit steam 501 into first and second bit streams, where the first bit stream includes selected mapping bits (e.g., $b_1$, $b_2$, $b_4$, $b_5$) from each information bit group in the incoming bit stream 501, while the second bit stream includes selected quadrant selection bits (e.g., $b_0$, $b_3$) from each information bit group in the incoming bit stream 501. By providing the first bit stream to the 16-QAM mapper 507, the resulting 16-QAM vector X from the mapper 507 may be provided to the vector processor 510 using only a 16-point look-up table 503 that is stored in memory. In addition, the QPSK quadrant selector 506 processes the second bit stream to generate quadrant selection output values from the QPSK quadrant selector 506 may be provided to the vector processor 510 which generates corresponding quadrant offset vectors. At the vector processor 510, the 16-QAM vector X and quadrant selection output values are transformed and combined to generate the 64-QAM symbol vector output 520.

Figure 5:
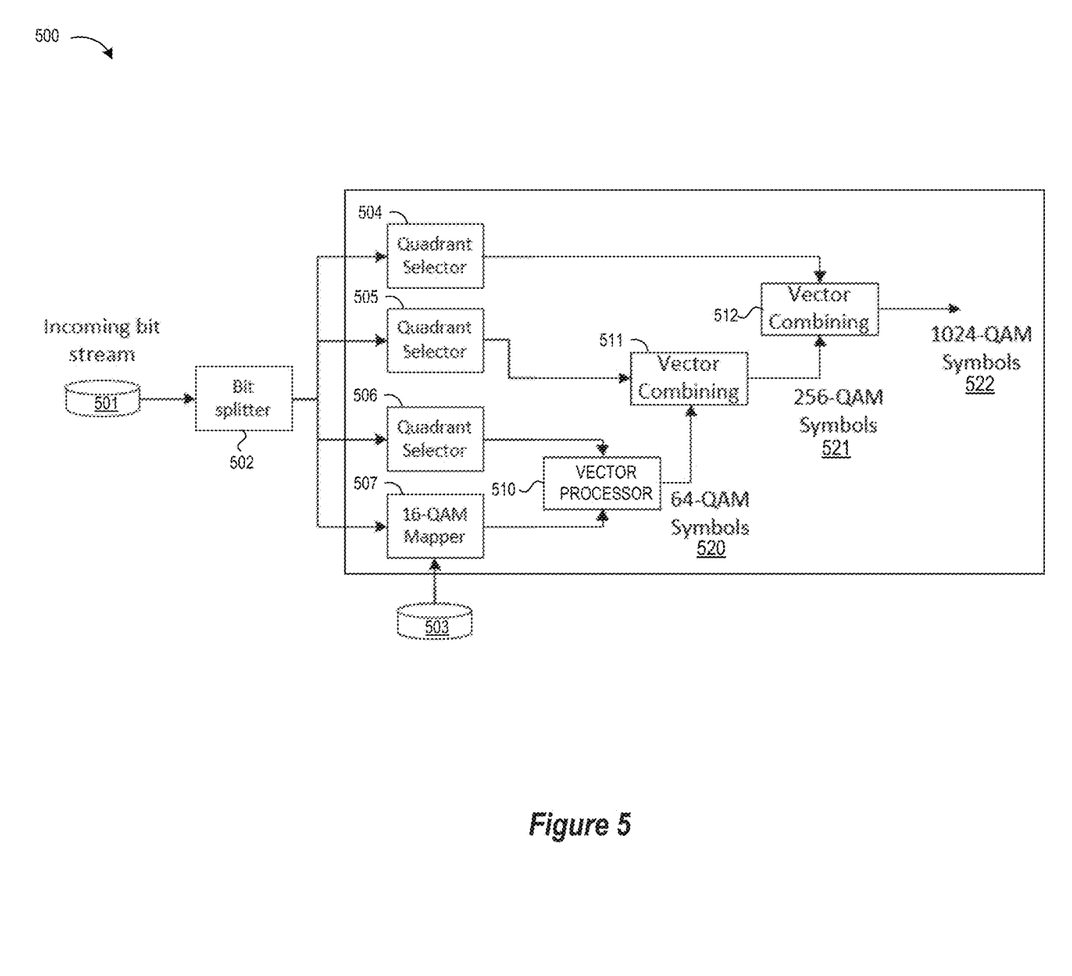
FIG. 5 is a schematic block circuit diagram of a wireless communication transmitter system having a vector processor for building a higher order symbol constellation map from a 16 QAM mapper and a quadrant selector in accordance with selected embodiments of the present disclosure.

As depicted in FIG. 5, this approach may be easily extended to higher order modulation schemes by simply adding one or more cascaded QPSK selectors. For example, by processing selected bits from the incoming bit stream 501, an additional cascaded QPSK quadrant selector 505 generates quadrant selection output values by using predetermined selection logic to determine from the selected bits which quadrant the intended 256-QAM symbol is located. At the vector combining processor unit 511, the quadrant selection output values from the QPSK quadrant selector 505 are processed to generate corresponding quadrant offset vectors which are combined with the 64-QAM symbol vector output 520, thereby generating a 256-QAM symbol vector output 521. As a result, the incoming bit stream can be mapped to a 256-QAM modulator by simply cascading a QPSK quadrant selector 505 with the 64-QAM mapper (formed from the 16-QAM mapper 507 and QPSK quadrant selector 506), thereby eliminating the memory requirement for storing a 256-point look-up table since only a 16-point look-up table 503 is required.

And to extend this approach to 1024-QAM modulator encoder, all that is required is an additional cascaded QPSK quadrant selector 504 which uses predetermined selection logic to process selected bits from the incoming bit stream 501 to generate quadrant selection output values identifying which quadrant the intended 1024-QAM symbol is located. At the vector combining processor unit 512, the quadrant selection output values from the QPSK quadrant selector 504 are processed to generate corresponding quadrant offset vectors which are combined with the 256-QAM symbol vector output 521, thereby generating a 1024-QAM symbol vector output 522, thereby mapping the incoming bit stream to a 1024-QAM modulator without the memory requirement for storing a 1024-point look-up table. Thus, regardless of the modulation order, the present disclosure requires that only one fixed 16-QAM constellation table be stored in memory.

Figure 6:
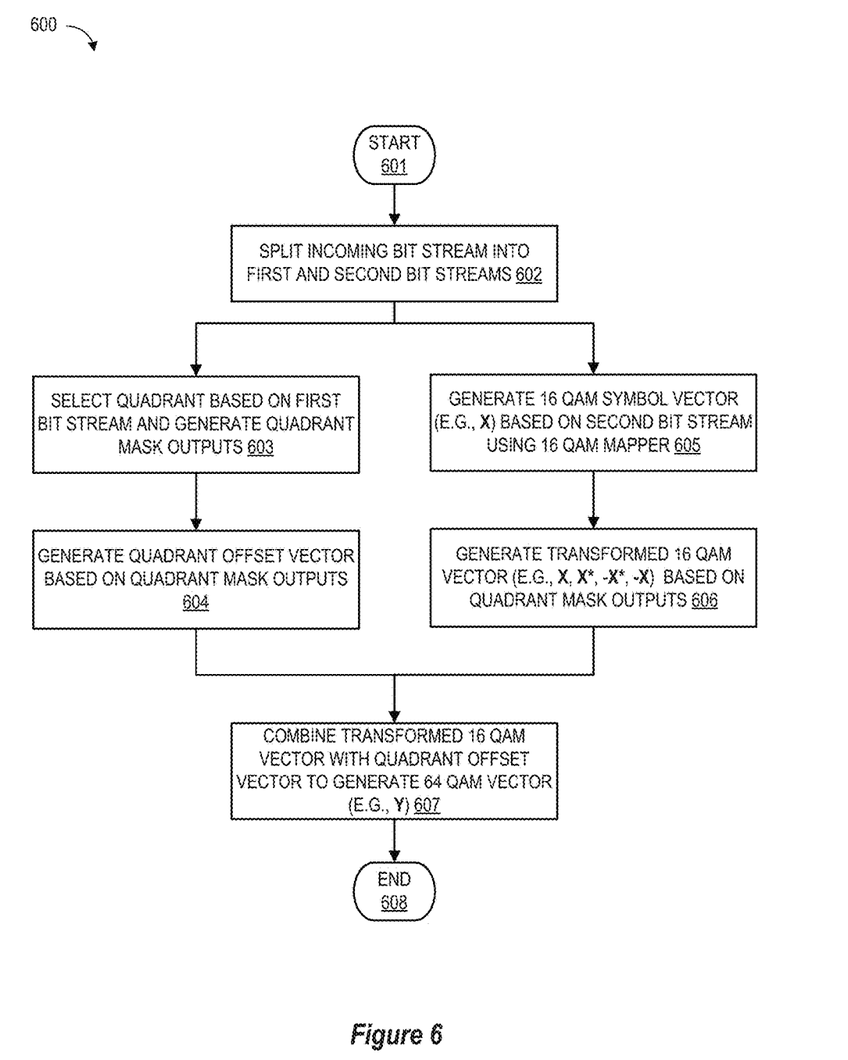
FIG. 6 illustrates a simplified flow chart showing the logic for performing hierarchical modulation with vector processing in accordance with selected embodiments of the present disclosure.

To provide additional details for an improved understanding of selected first embodiments of the present disclosure, reference is now made to FIG. 6 which depicts a simplified flow chart 600 showing the logic for performing hierarchical modulation with vector processing. In an example embodiment, the processing shown in FIG. 6 may be performed at a baseband processor with a constellation mapping engine embodied with dedicated hardware, software, or hybrid implementations and configured for processing an incoming bit stream into 16-QAM mapping bits and quadrant selection bits which are used to generate, respectively, transformed 16-QAM vectors and quadrant offset vectors which are combined on the basis of quadrant masking outputs to generate a higher order (e.g., 64-QAM) symbol vector while using only a fixed 16-point constellation map.

At step 601, the methodology starts with the control logic and/or hardware at the transceiver baseband processor system which is configured to split a received incoming bit stream into first and second bit streams (step 602). Depending upon the symbol values for the target constellation map, the first bit stream may include selected bits (e.g., $b_1$, $b_2$, $b_4$, $b_5$) from each group of incoming bit stream, while the second bit stream may include selected bits (e.g., $b_0$, $b_3$) from each group of incoming bit stream. As will be appreciated, any bit splitter or other bit selection or masking circuit may be used at step 602.

Using the first bit stream, a QPSK quadrant selector selects a quadrant for the intended 64-QAM constellation map and also generates quadrant mask outputs at step 603. In selected embodiments, predetermined bits (e.g., bits $b_0$ and $b_3$) from the first bit stream are processed by the quadrant selector to select a corresponding quadrant and to generate corresponding quadrant selector outputs which are input to the vector processor. At step 604, the quadrant selector outputs are used to generate quadrant offset vectors. In selected embodiments, the quadrant offset vectors are generated by applying quadrant selector outputs to quadrant masks for combination with predetermined quadrant offset vectors based on the masking results.

In parallel, the second bit stream is used by a 16-QAM mapper to generate a 16-QAM symbol vector (e.g., X) at step 605. In selected embodiments, the 16-QAM mapper uses a fixed 16-element mapping lookup table to generate 16-QAM symbols (e.g., $S_0$, $S_1$, $S_2$, $S_3$) which are converted into vector form for input to the vector processor. At step 606, the 16-QAM symbol vector (e.g., X) is used to generate a transformed 16-QAM vector (e.g., X, X*, −X*, −−X) based on quadrant mask outputs generated from the first bit stream.

At step 607, the transformed 16-QAM vector (from step 606) and quadrant offset vector (from step 604) are combined to generate a 64-QAM vector (e.g., Y). In selected embodiments, the processing at step 607 may be performed by the vector processor which includes quadrant masks, transformation units, multipliers and summing circuits which are connected to generate higher order mapping symbols (e.g., 64 QAM symbols) for use in additional processing, either at a modulator or at the vector processor which performs vector combination operations for higher order modulators. At step 608, the process ends.

A constellation mapping system, apparatus, and methodology are described for a wireless transceiver communication system which uses one or more quadrant selectors and a 16 QAM mapper to perform hierarchical modulation with a vector processor and a fixed 16 QAM constellation table. In selected embodiments, a constellation mapping engine is disclosed which may be implemented with a vector processor which performs vector combination operations on vectorized outputs from quadrant selector and 16 QAM mapper to calculate higher order mapping symbols (e.g., 64 QAM symbols) for input to a modulator. In addition, the ability to build a higher order modulation transceiver using a basic quadrant selector and a 16-QAM mapper which only needs a fixed 16-element mapping table eliminates the need to maintain a number of mapping tables, thereby significantly reducing the table memory storage requirements. In selected embodiments of the present disclosure, predetermined bits (e.g., bits $b_0$ and $b_3$) from an incoming bit stream are processed by a quadrant selector to select a corresponding quadrant and to generate therefrom a quadrant offset vector, such as by applying quadrant selector outputs to quadrant masks for combination with predetermined quadrant offset vectors based on the masking results. In addition, the remaining bits of the incoming bit stream are applied to a 16 QAM mapper and to generate therefrom a 16 QAM symbol vector which is transformed by the vector processor based on the masking results, and then combined with the quadrant offset vector. Using the vector processor to combine the vectorized outputs from quadrant selector and 16 QAM mapper, higher order mapping symbols (e.g., 64 QAM symbols) are generated for use in additional processing, either at a modulator or at the vector processor which performs vector combination operations using an appropriately scaled vector offset value (e.g., 2× or 4×). In disclosing the claimed apparatus, system, and method for performing constellation mapping by using individually configurable rules with a 16 QAM map and quadrant selector, rather than humans, to compute and combine a transformed 16 QAM vector and quadrant offset vector into a higher order QAM symbol vector using predetermined bits from an incoming bitstream, there is disclosed an improvement in computer-related technology for improving the performance, speed, and accuracy of a wireless transceiver communication system.

As disclosed herein, the disclosed method, system, and apparatus for mapping information bits onto a higher order constellation may be implemented as a constellation mapping engine embodied with dedicated hardware, software, or hybrid implementations that is connected and controlled by control logic and/or computer program product having program code portions for performing steps of a method and/or for performing functions of a device or system which uses elementary operations to process selected bit stream bits with a 16-QAM mapper and quadrant selector to generate vectorized quadrant offset vectors and 16-QAM symbol vectors which are masked and combined to form final higher order QAM symbols. Although embodiments are described in the context of processing the 16-QAM mapper to generate 64 QAM symbols, the proposed approach may be extended to higher order symbol mapping outcomes by cascading a plurality of quadrant selectors with the 16-QAM mapper. In contrast to conventional approaches which require large memories to store lookup tables for the higher order constellation mapping, the constellation mapping engine provides a much more efficient use of memory in requiring storage of only a fixed 16-element lookup table.

Some of the above embodiments, as applicable, may be implemented using a variety of different data processing systems. For example, although FIG. 4 and the discussion thereof describe an exemplary data processing architecture wherein the transmitter system 400 employs a combination of a 16-QAM mapper, quadrant selector and vector processor to implement an memory-efficient constellation mapping algorithm that is designed with a high degree of parallelism in mind, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architecture depicted herein is merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

By now it should be appreciated that there has been provided a constellation mapping apparatus, method, program code, and system for mapping a received bit stream of data to a higher order symbol vector. In the disclosed apparatus, method, program code, and system, a bit stream of data is received and split into first and second sets of selected bits from the bit stream. The first set of selected bits is processed with a quadrant selector to generate quadrant selection information which is used to identify a first quadrant offset vector corresponding to a higher order quadrant in which an intended symbol is to be mapped. In selected embodiments, the first set of selected bits is processed by supplying two bits from each group of six bits in the received bit stream to the quadrant selector to identify the first quadrant offset vector. In other embodiments, the first set of selected bits is processed by supplying the first set of selected bits to a plurality of quadrant masks to generate masked quadrant selector output values which are combined with predetermined quadrant offset vectors to generate the first quadrant offset. In addition, the second set of selected bits is processed with a 16-QAM mapper to identify a 16-QAM symbol vector. In selected embodiments, the second set of selected bits is processed by supplying four bits from each group of six bits in the received bit stream to the 16-QAM mapper to identify the 16-QAM symbol vector. In selected embodiments, the 16-QAM mapper may use a fixed 16-element lookup table to map the four bits to a 16-QAM constellation map. In other embodiments, the 16-QAM mapper may use a fixed 4-element lookup table to map two of the four bits to 16-QAM I or Q stream. Once generated, the 16-QAM symbol vector is transformed into a transformed 16-QAM symbol vector based on the quadrant selection information which identifies the higher order quadrant in which the intended symbol is to be mapped. In selected embodiments, the 16-QAM symbol vector may be transformed by generating a first transformed 16-QAM symbol vector that is transformed with an identify function, that is inverted around an I-axis, that is inverted around a Q-axis, or is inverted around both the I-axis and Q-axis. Subsequently, the transformed 16-QAM symbol vector is combined with the first quadrant offset vector to map the bit stream of data to a higher order symbol vector, such as a 64-QAM vector. In addition, the transformed 16-QAM symbol vector may be combined with the first quadrant offset vector and a second quadrant offset vector generated by a cascaded quadrant selector to map the bit stream of data to a 256-QAM vector.

In another form, there is provided a transmitter apparatus and associated method for mapping data to constellation map symbols. The disclosed transmitter apparatus includes a demultiplexer that receives a stream of data arranged in bits and produces a first bitstream and a second bitstream, where the first bitstream containing a smaller portion of the stream of data than the second bitstream. The disclosed transmitter apparatus also includes a first quadrant selector coupled to the demultiplexer that encodes the first bitstream to identify a higher order quadrant in which an intended symbol is to be mapped. In selected embodiments, the first quadrant selector encodes the first bitstream by processing two bits from predetermined positions in each group of six bits in the received stream of data to identify the higher order quadrant. In addition, the transmitter apparatus includes a 16-QAM symbol mapper coupled to the demultiplexer that maps the second bitstream to a region of a 16-QAM symbol constellation map by identifying a 16-QAM symbol vector. In selected embodiments, the 16-QAM symbol mapper maps the second bitstream by processing four bits from predetermined positions in each group of six bits in the received stream of data to identify the 16-QAM symbol vector, such as by using a fixed 16-element lookup table to map the four bits to a 16-QAM constellation map or by using a fixed 4-element lookup table to map two of the four bits to 16-QAM I or Q stream. Finally, the disclosed transmitter apparatus includes a vector processor coupled to the first quadrant selector and the 16-QAM symbol mapper, where the vector processor is configured to transform the 16-QAM symbol vector into a transformed 16-QAM symbol vector based on the identified higher order quadrant and to combine the transformed 16-QAM symbol vector with the first quadrant offset vector to map the bit stream of data to a higher order symbol vector, such as a 64-QAM vector, a 256-QAM vector, or a 1024-QAM vector. In selected embodiments, the vector processor supplies information identifying the higher order quadrant to a plurality of quadrant masks to generate masked quadrant selector output values which are combined with predetermined quadrant offset vectors to generate the a quadrant offset vector. In addition, the vector processor may be configured to transform the 16-QAM symbol vector by generating a first transformed 16-QAM symbol vector that is transformed with an identify function, that is inverted around an I-axis, that is inverted around a Q-axis, or is inverted around both the I-axis and Q-axis.

In yet another form, there is provided a method for mapping a bit stream of data to a 64-QAM constellation map symbol vector. In the disclosed methodology, a 16-QAM symbol constellation map is stored in in memory as a lookup table. In addition, a received bit stream is demultiplexed into a first bit stream of selected bits and a second bit stream. Using a quadrant selector, the first bit stream is processed to identify a first quadrant offset vector corresponding to a higher order quadrant in which an intended symbol is to be mapped. In addition, a 16-QAM mapper is used to process the second bit stream by retrieving the 16-QAM symbol constellation map from memory to identify a 16-QAM symbol vector. After transforming the 16-QAM symbol vector into a transformed 16-QAM symbol vector based on the identified higher order quadrant, the transformed 16-QAM symbol vector is combined with the first quadrant offset vector to map the bit stream of data to a 64-QAM constellation map symbol vector. In accordance with the disclosed method, the higher order symbol vector may be combined with one or more additional higher order quadrant offset vectors to map the bit stream of data to a 256-QAM vector or a 1024-QAM vector.

Various illustrative embodiments of the present invention have been described in detail with reference to the accompanying figures. While various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art. Although the described exemplary embodiments disclosed herein are directed to an exemplary soft bit computation engine, the present invention is not necessarily limited to the example embodiments illustrate herein, and various embodiments of the circuitry and methods disclosed herein may be implemented with other devices and software components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising." or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A constellation mapping method comprising:
    processing a first set of selected bits from a received bit stream of data with a quadrant selector to generate quadrant selection information which is used to identify a first quadrant offset vector corresponding to a higher order quadrant in which an intended symbol is to be mapped;
    processing a second set of selected bits from the received bit stream of data with a 16-QAM mapper to identify a 16-QAM symbol vector;
    transforming the 16-QAM symbol vector into a transformed 16-QAM symbol vector based on the quadrant selection information; and
    combining the transformed 16-QAM symbol vector with the first quadrant offset vector to map the received bit stream of data to a higher order symbol vector.

2. The constellation mapping method of claim 1, where processing the first set of selected bits comprises supplying two bits from each group of six bits in the received bit stream of data to the quadrant selector to identify the first quadrant offset vector.

3. The constellation mapping method of claim 1, where processing the first set of selected bits comprises supplying the first set of selected bits to a plurality of quadrant masks to generate masked quadrant selector output values which are combined with predetermined quadrant offset vectors to generate the first quadrant offset vector.

4. The constellation mapping method of claim 1, where processing the second set of selected bits comprises supplying four bits from each group of six bits in the received bit stream of data to the 16-QAM mapper to identify the 16-QAM symbol vector.

5. The constellation mapping method of claim 4, where the 16-QAM mapper uses a fixed 16-element lookup table to map the four bits to a 16-QAM constellation map.

6. The constellation mapping method of claim 4, where the 16-QAM mapper uses a fixed 4-element lookup table to map two of the four bits to 16-QAM I or Q stream.

7. The constellation mapping method of claim 1, where transforming the 16-QAM symbol vector comprises generating a first transformed 16-QAM symbol vector that is transformed with an identify function, that is inverted around an I-axis, that is inverted around a Q-axis, or is inverted around both the I-axis and Q-axis.

8. The constellation mapping method of claim 1, where the transformed 16-QAM symbol vector is combined with the first quadrant offset vector to map the received bit stream of data to a 64-QAM vector.

9. The constellation mapping method of claim 1, where the transformed 16-QAM symbol vector is combined with the first quadrant offset vector and a second quadrant offset vector generated by a cascaded quadrant selector to map the received bit stream of data to a 256-QAM vector.

10. The constellation mapping method of claim 9, where the 256-QAM vector is combined with a third quadrant offset vector generated by a cascaded quadrant selector to map the received bit stream of data to a 1024-QAM vector.

11. A transmitter apparatus for mapping data to constellation map symbols comprising:
a demultiplexer that receives a stream of data arranged in bits and produces a first bitstream and a second bitstream, the first bitstream containing a smaller portion of the stream of data than the second bitstream;
a first quadrant selector, coupled to the demultiplexer, that encodes the first bitstream to identify a higher order quadrant in which an intended symbol is to be mapped;
a 16-QAM symbol mapper, coupled to the demultiplexer, that maps the second bitstream to a region of a 16-QAM symbol constellation map by identifying a 16-QAM symbol vector;
a vector processor coupled to the first quadrant selector and the 16-QAM symbol mapper which is configured to transform the 16-QAM symbol vector into a transformed 16-QAM symbol vector based on the identified higher order quadrant and to combine the transformed 16-QAM symbol vector with the first quadrant offset vector to map the received stream of data to a higher order symbol vector.

12. The transmitter apparatus of claim 11, where the first quadrant selector encodes the first bitstream by processing two bits from predetermined positions in each group of six bits in the received stream of data to identify the higher order quadrant.

13. The transmitter apparatus of claim 11, where the vector processor supplies information identifying the higher order quadrant to a plurality of quadrant masks to generate masked quadrant selector output values which are combined with predetermined quadrant offset vectors to generate the a quadrant offset vector.

14. The transmitter apparatus of claim 1, where the 16-QAM symbol mapper maps the second bitstream by processing four bits from predetermined positions in each group of six bits in the received stream of data to identify the 16-QAM symbol vector.

15. The transmitter apparatus of claim 14, where the 16-QAM symbol mapper uses a fixed 16-element lookup table to map the four bits to a 16-QAM constellation map.

16. The transmitter apparatus of claim 14, where the 16-QAM symbol mapper uses a fixed 4-element lookup table to map two of the four bits to 16-QAM I or Q stream.

17. The transmitter apparatus of claim 14, where the vector processor transforms the 16-QAM symbol vector by generating a first transformed 16-QAM symbol vector that is transformed with an identify function, that is inverted around an I-axis, that is inverted around a Q-axis, or is inverted around both the I-axis and Q-axis.

18. The transmitter apparatus of claim 11, where the higher order symbol vector comprises a 64-QAM vector, a 256-QAM vector, or a 1024-QAM vector.

19. A method comprising:
storing a 16-QAM symbol constellation map in memory as a lookup table;
demultiplexing a received bit stream of data into a first bit stream of selected bits and a second bit stream;
processing the first bit stream with a quadrant selector to identify a first quadrant offset vector corresponding to a higher order quadrant in which an intended symbol is to be mapped;
processing the second bit stream with a 16-QAM mapper by retrieving the 16-QAM symbol constellation map from memory to identify a 16-QAM symbol vector;
transforming the 16-QAM symbol vector into a transformed 16-QAM symbol vector based on the identified higher order quadrant; and
combining the transformed 16-QAM symbol vector with the first quadrant offset vector to map the received bit stream of data to a 64-QAM constellation map symbol vector.

20. The method of claim 19, further comprising combining the higher order symbol vector with one or more additional higher order quadrant offset vectors to map the received bit stream of data to a 256-QAM vector or a 1024-QAM vector.

* * * * *